Patented June 30, 1925.

1,544,343

UNITED STATES PATENT OFFICE.

HENRY R. POWER, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ABRASIVE COMPOSITION.

No Drawing.   Application filed April 5, 1921. Serial No. 458,804.

*To all whom it may concern:*

Be it known that I, HENRY R. POWER, a citizen of the United States, residing at Niagara Falls, in the county of Niagara and State of New York, have invented a new and useful Improvement in Abrasive Compositions, of which the following is a full, clear, and exact description.

The abrasive or grinding composition herein referred to is for grinding metal surfaces, such as valve seats for motor engines or for any grinding operation where it is proposed to make a tight joint between two metal surfaces.

I use a gelatinous body or jelly to hold the abrasive particles. I also preferably add a hygroscopic or water retaining material to prevent the grinding composition from drying out on exposure to the air.

The jelly is made from certain jelly forming algæ such as certain seaweeds and lichens. These, when soaked in cold water, then boiled, filtered and slightly evaporated, yield a jelly, which makes a satisfactory grinding composition when mixed with abrasive particles. There are very many algæ that have this gelatinizing power and I use the ones commercially available. These are "*Chondrus crispus*," a seaweed, known commercially as Carrageen moss or Irish moss; also "*Gelideum corneum*," a seaweed commercially called Chinese moss, Japanese isinglass, Japanese gelatine, vegetable isinglass or agar-agar, also "*Cetraria islandica*" a lichen commonly called Iceland moss. While I have used the botanical name to identify these jelly-forming algæ, they may not, when commercially available, be wholly isolated from other algæ of similar jelly-forming characteristics. I have included among the algæ those plants called lichens because the lichens are characterized botanically as algæ on which fungi are supported.

In the production of the abrasive composition herein referred to, I first soak the alga in cold water for a few hours, then boil until the whole of the jelly-forming part of the alga has gone into solution or suspension. Then I filter to remove the non-jelly-forming portion, and evaporate to produce the required jelly strength. The abrasive particles and glycerine are now stirred in and when the whole cools, a preservative added in the form of formaldehyde.

The proportions I find satisfactory are

|  | Parts. |
|---|---|
| Water | 44 |
| Irish moss | 4 |
| Glycerine | 2 |
| Carborundum | 50 |
| Formalin | $\frac{1}{10}$ |

The function of the glycerine is to counteract the drying tendency of such a paste, when exposed to the air.

While I prefer to use glycerine, other hygroscopic or moisture-retaining bodies may be used. I may also use such hygroscopic or moisture retaining bodies with abrasive compositions having gelatinous bases made from materials such as glue, edible gelatine, starch, flour, etc.

While I have stated definite proportions of the ingredients, I may change these, depending on the nature of the jelly required, the size of the particles of abrasive or for similar reasons. Moreover, the abrasive may be other than carborundum. If it is so desired, a filler to give body to the jelly may be added in the nature of finely powdered soapstone. The present invention is not limited to its specific embodiments above described but may be otherwise embodied within the scope of the following claims.

I claim:

1. An abrasive composition comprising abrasive particles and an algæ jelly-product, said composition being substantially free from either alum or oil substantially as described.

2. An abrasive composition comprising abrasive particles, an algæ jelly-product and glycerine, said composition being substantially free from either alum or oil substantially as described.

3. An abrasive composition comprising abrasive particles, an algæ jelly-product and a filler, said composition being substantially free from either alum or oil substantially as described.

4. An abrasive composition comprising abrasive particles, a gelatinous material and a moisture-retaining material, said composition being substantially free from either alum or oil substantially as described.

5. An abrasive composition comprising a jelly made from Irish moss and water, 50 parts of carborundum, 2 parts of glycerine, and $\frac{1}{10}$ part of formalin, substantially as described.

In testimony whereof, I have hereunto set my hand.

HENRY R. POWER.